Nov. 30, 1948.  A. C. HOWELL, JR  2,454,923
EMERGENCY WHEEL
Filed Feb. 20, 1946  2 Sheets-Sheet 1
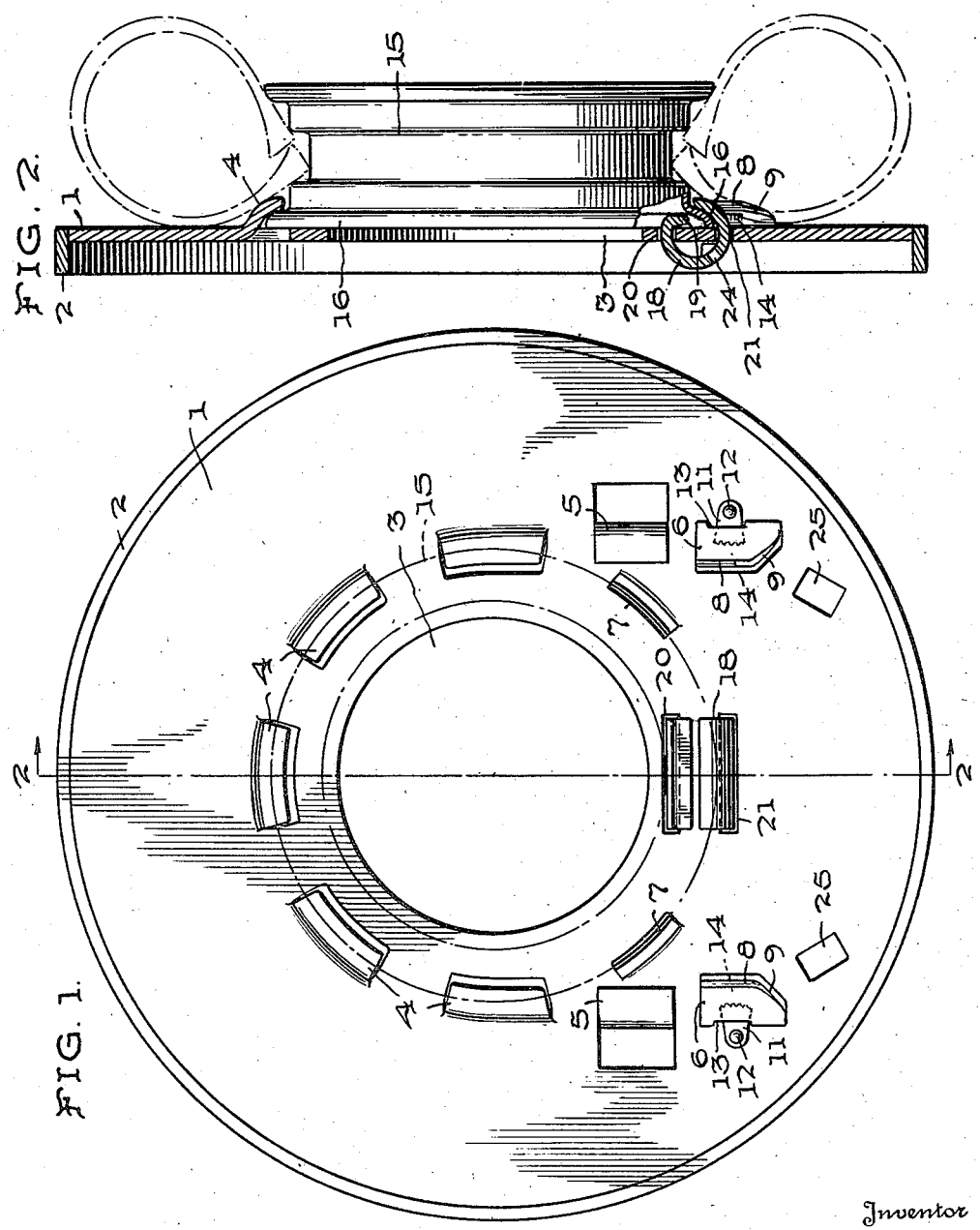
Inventor
ALLEYNE C. HOWELL JR.
By Pennie Edmonds Morton Barrows
Attorney Nov. 30, 1948.   A. C. HOWELL, JR   2,454,923
EMERGENCY WHEEL
Filed Feb. 20, 1946   2 Sheets-Sheet 2
FIG. 3.   FIG. 4.   FIG. 5.
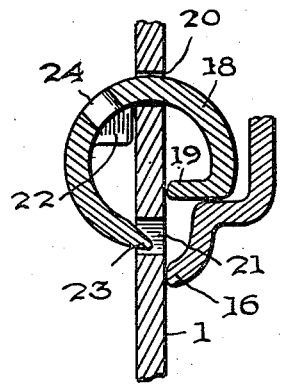
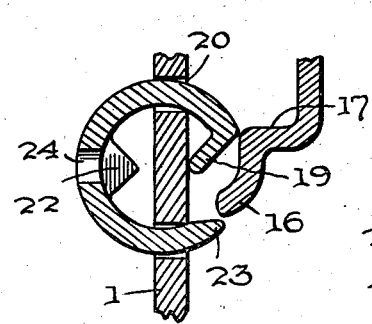
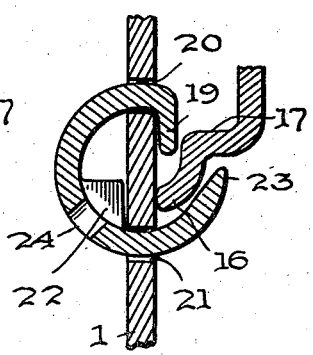
FIG. 6.   FIG. 7.
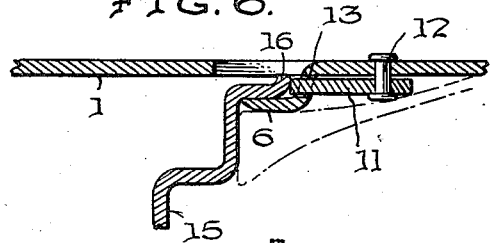
FIG. 8.   FIG. 9.
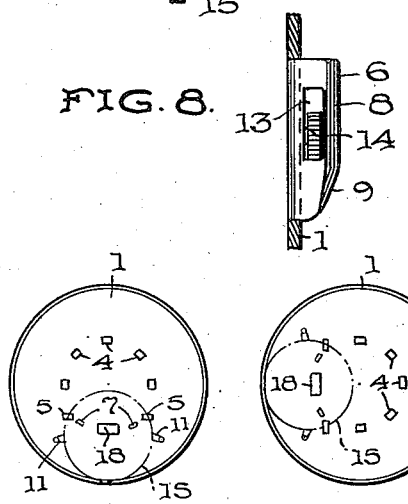
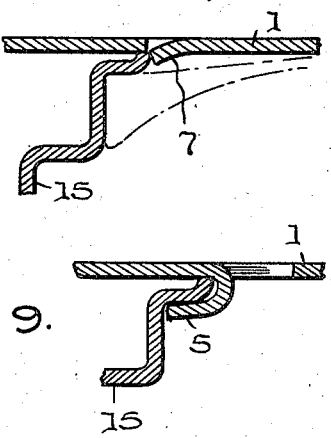
FIG. 10.   FIG. 11.   FIG. 12.   FIG. 13.
Inventor
ALLEYNE C. HOWELL JR.
Attorney Patented Nov. 30, 1948

2,454,923

UNITED STATES PATENT OFFICE 2,454,923

EMERGENCY WHEEL

Alleyne C. Howell, Jr., Dallas, Tex.

Application February 20, 1946, Serial No. 648,882

18 Claims. (Cl. 301—38)

This invention relates to an emergency wheel to be used on automobiles, trucks, and the like, utilizing wheels having pneumatic, collapsible or replaceable tires.

As is well known, it frequently happens that the tire of an automobile, or the like, goes "flat" due to a puncture, blow out, or other causes. Ordinarily, the usual procedure is to elevate the wheel or axle by means of a jack, or other lifting mechanism, and to remove and replace the tire. Ordinarily, that involves removing the rim or wheel on which the tire is mounted, replacing it with another rim or wheel on which a sound tire is mounted, and finally lowering the wheel to normal operating position. Such operations involve the use of several tools such as jacks, or other lifting mechanism, wrenches, and the like, and is a time consuming, and often an exasperating operation, particularly if one is not attired for the performing of such operations. Moreover, it sometimes happens that the flat is gotten when, due to lack of proper facilities or tools or to the lack of a replacement tire or wheel, another tire or wheel cannot be substituted for the flat or damaged tire. If a flat tire is driven on, it is damaged beyond repair within a very short time. Likewise, if the flat tire is removed and the wheel run on the rim, the rim will be seriously damaged, particularly if operating on a hard surfaced road.

Heretofore various types of emergency or substitute wheels having extended flanges to permit operation in a restricted manner with the original tire in place have been proposed, but such emergency or substitute wheels have not provided for safeguarding the damaged tire nor for the operation of the wheel on a diameter equal to the normal diameter of the tire in a satisfactory manner. Also, it has been proposed to provide roller-skate type supports on which the wheel and damaged tire could be mounted. However, such devices, like the emergency or substitute wheels previously referred to, have not provided a satisfactory means of mounting or automatically locking in operating position a fully dimensioned emergency operating wheel, by the mere use of the rotation of the regular wheel on which such substitute devices are to be mounted.

The present invention comprehends a wheel which, in an emergency, may be adapted to and support a wheel having a pneumatic, collapsible or replaceable tire which has been damaged beyond service, or has been lost or destroyed and which will obviate the necessity of having an additional tire and the equipment necessary for its installation. The invention also comprehends such an emergency wheel which may be mounted and operated effectively as a substitute for the regular wheel without removing the tire normally employed with the regular wheel, and without causing further damage to such tire.

The emergency wheel of the present invention may be mounted on the regular wheel without the use of separate tools and mounting means, and without the use of jacks or other lifting mechanism, or without the necessity of removing the regular wheel. To that end, the emergency wheel may be mounted on the regular wheel by the normal revolving motion of the regular wheel about its axis and by the force normally applied for that purpose.

More specifically, the present invention comprises an emergency wheel adapted to be secured to the regular wheel of an automobile or the like without removing the flat or damaged tire and which has a tread portion of the same diameter as the diameter of the tire when inflated. The emergency wheel is provided with a series of concentrically-arranged lugs for engaging the periphery of the wheel at the outer side of the tire which are so constructed and arranged as to permit the emergency wheel to be secured in operative position onto the regular wheel by the revolving motion of the regular wheel, and then automatically locked to the rim of the regular wheel so that the emergency wheel may be driven on, the same as the regular wheel with the inflated tire.

The invention will be further described in connection with the accompanying drawings, but it is to be understood that such further disclosure and description is by way of exemplification and the invention is not limited thereto except to the extent set forth in the appended claims.

In the drawings:

Fig. 1 is an inside or rear elevational view of an emergency wheel embodying my invention, Fig. 2 is a vertical cross sectional view on line 2—2 of Fig. 1 and showing the emergency wheel secured to a rim carrying a damaged tire, Figs. 3, 4 and 5 are detailed cross sectional views illustrating various portions of the automatic locking device during the securing of the emergency wheel on to a wheel rim, Figs. 6, 7 and 8 are detailed sectional views, Fig. 9 is a cross sectional view of a modified form of guiding lug for use in securing the emergency wheel in place on a wheel rim, and Figs. 10, 11, 12 and 13 are diagrammatic views showing the various stages during the mounting of the emergency wheel onto a wheel rim carrying a deflated tire.

Referring to the drawings, the emergency wheel comprises a central disc or web section 1 having an outwardly extending peripheral flange rim 2. The rim 2 may be formed integrally with the web section 1 or may be a separately formed hardened steel rim or be a U-shaped rim and mounted with small rubber tire such rims being welded or otherwise secured to the web section.

The web section 1 is provided with a central aperture 3 to permit mounting of the emergency wheel on an ordinary rim or wheel of an automobile without interfering with the hub cap, or preventing access to the hub cap or mechanism thereunder. The provision of such an opening is particularly desirable where the wheel is of the de-mountable type and the bolts for securing the wheel onto the hub are located behind the hub cap.

The web section 1 is provided with a plurality of main retaining lugs 4 struck from the body of the web section, as shown in Figs. 1 and 2 and positioned substantially in a semi-circle concentric with the central aperture 3. In addition to the main retaining lugs 4, the web section also is provided with a pair of guiding lugs 5 and a pair of mounting lugs 6 arranged substantially in alignment with the end lugs 4, so that the main retaining lugs 4, the guiding lugs 5, and the mounting lugs 6 define a U-shaped space into which the wheel rim passes during the mounting of the emergency wheel thereon.

In addition to the above-mentioned lugs, the web section 1 is further provided with a pair of auxiliary retaining lugs 7 which are positioned at opposite sides of a vertical median line, at the lower side of the aperture 3. The lugs 7 are positioned concentrically with the central aperture 3 in the arc of the circle including the main retaining lugs 4 and are adapted to engage the rim of a wheel and cooperate with the lugs 4 in retaining the emergency wheel in place on a wheel rim.

The mounting lugs 6 are generally trapezoidal in shape and have their inner and lower edges 8 and 9 beveled at an angle such that when the emergency wheel is mounted on a rim carrying a deflated tire, in the manner hereinafter described, the beveled edges 8 and 9 will engage the deflated tire and deflect it away from the outer edge of the rim a distance sufficient to permit the mounting lugs 6, the guiding lugs 5 and the main retaining lugs 4 to engage behind the outer edge of the rim, between the rim and the adjacent bead of the tire casing.

A non-return cam or detent 11 is pivotly mounted as at 12 to the main web section just outwardly of the edge of each mounting lug 6. The inner end of the non-return cams or detents 11 extend through an opening 13 formed in each of the mounting lugs adjacent to web section 1 so that they are in the path of movement of the wheel rim when the emergency wheel is being mounted thereon. The inner or distal end of the non-return cams or detents 11 are slightly curved and serrated so as to better grip the edge of a wheel rim being passed between them.

The manner of mounting the emergency wheel on the wheel of an automobile having a flat tire is shown diagrammatically in Figs. 10 to 13 in which the wheel of the automobile is indicated by broken lines.

As shown in Fig. 10, the emergency wheel is placed over the outside of the automobile wheel 15, with the mounting lugs 6 engaging behind the outer flange 16 of the automobile wheel (Fig. 2). The beveled edges 8 and 9 permit the general trapezoidal shape of the mounting lug 6 to engage the rim flange 16 by pushing the tire casing away from the flange 16 a distance sufficient to permit such action. Small apertures 25 in web section 1 permit the use of a lever where additional force is necessary to insert mounting lugs 6 between tire casing and the flange 16.

The emergency wheel is pushed down onto the rim flange until the bottom of the rim 2 engages the ground (Fig. 10). In that position the serrated faces 14 of the non-return cams or detents 11 grip the periphery of the rim flange and prevent movement in a reverse direction by the emergency wheel.

The automobile is then slowly moved forward or backward under its own power, whereupon the load is taken by the emergency wheel as it and the automobile rim assume the relative positions shown in Fig. 11, and later in Figs. 12 and 13. When the relative positions are as shown in Fig. 12, the weight of the automobile is supported by the emergency wheel causing the rim to start moving to the base of the U-shaped space defined by the mounting lug 6, the guiding lugs 5, and the main retaining lugs 4, until it finally arrives at the base of the U-shaped space (Fig. 13) at which time the main retaining lugs 4 and the auxiliary retaining lugs 7 engage behind the rim flange and hold the emergency wheel securely in place.

As the wheel rim 15 slides into its final position (Figs. 2 and 13), the rim flange 16 automatically springs the web 1 sufficiently to let the rim flange 16 follow in behind the auxiliary retaining lug 7 and effects the locking of the emergency wheel to the rim 15.

The automatic locking means comprises a cylindrical member 18 which is split longitudinally and has one longitudinal edge 19 turned inwardly so that in transverse cross-section the member 18 is generally of C shape. The member 18 is mounted for limited rotative movement in parallel slots 20 and 21 in the web section 1. In-folded lugs 22 at each end of the cylindrical locking member 18 maintain the axis of that member in central and parallel position with respect to the center plane of the web section 1. The inturned edge 19 of the cylindrical member 18 provides an enlarged surface for engagement by the shoulder 17 of the wheel rim 15, while the other longitudinal edge 23 is beveled to better facilitate its passage behind the rim flange 16.

Referring now to Figs. 3, 4, and 5, it will seem that just before the wheel rim 15 moves into final position behind the main retaining lugs 4 and the auxiliary lugs 7, the shoulder 17 of the rim flange engages the in-turned edge 19 of the member 18 (Fig. 3). Further movement of the wheel rim to its final position behind the lugs 4 and 7 causes the member 18 to be rotated anti-clockwise (Fig. 4) and the edge 23 to move to a position where it is about to pass behind the rim flange 16. When the wheel rim has moved to this position it also has been brought to the position of the auxiliary retaining lugs which normally would interfere with further inward movement of the wheel rim. However, rotation of the member 18 from the position shown in Fig. 3 to the position shown in Fig. 4 and the rim flange 16 passing over the auxiliary retaining lugs 7, which are smaller than and do not extend outwardly from the web section 1 as far as the main retaining lugs, cause the web section 1 to be sprung away from the rim flange 16 (indicated by the space between the two). As the wheel rim 16 moves to the position indicated in Fig. 5, web section 1 snaps back to its normal unsprung position and the edge 23 moves into the locking position behind the rim flange 16. Simultaneously, the lower edge of the rim flange moved into position behind the auxiliary retaining lug 7 so that the emergency wheel is securely attached to the wheel rim and forms an adequate support on which the vehicle may operate with the axle thereof at the normal distance from the roadway.

The member 18 is provided with an opening 24 through which a lever or other appropriate tool may be inserted for manual operation of the member 18, particularly when it is desired to remove the emergency wheel.

When it is desired to remove the emergency wheel, a lever is inserted in the opening 24 and the member 18 rotated in clockwise direction to its open position shown in Fig. 3. Such movement again causes a springing or planar distortion of the web section 1 and permits the rim flange 16 to be lifted up and over the auxiliary retaining lugs 7. The emergency wheel then may be slid off of the wheel rim 15 by holding the non-return detents or cams 11 out of the operative position.

Although planar distortion or springing of the web section 1 is necessary in applying and removing the emergency wheel, such distortion or springing cannot occur after the rim wheel is in operative position, and hence the emergency wheel will be held in lateral alignment with the wheel rim 15. Once the emergency wheel 15 has been mounted on a wheel rim 15, planar distortion or springing of the web section 1 can be effected only by manual rotation of locking member 18 in the manner described above, which is independent of any forces to which the emergency wheel is subjected during its use.

I claim:

1. A device of the class described comprising a disc wheel, a series of main retaining lugs formed at one side thereof and arranged substantially in a semi-circle, and mounting lugs formed at the same side of the disc wheel as the main retaining lugs, the mounting lugs being spaced at opposite sides of a median line and with said main retaining lugs defining a substantially U-shaped space into which the wheel of an automobile or the like may pass when the disc wheel is to be mounted thereon.

2. A device of the class described as defined in claim 1 having pivoted non-return detents extending into the said U-shaped space near the outer end thereof, adapted to prevent return movement of the wheel of an automobile or the like being inserted into said space.

3. A device of the class described as defined in claim 1 having non-return detents pivoted to said disc wheel and extending through openings in the mounting lugs to said U-shaped space, near the outer end thereof, adapted to prevent return movement of the wheel of an automobile or the like being inserted into said space.

4. A device of the class comprising a disc wheel, a series of main retaining lugs formed at one side thereof, and arranged substantially in a semi-circle, guiding lugs, and mounting lugs, the guiding lugs and the mounting lugs being formed in the same side of the disc wheel as the main retaining lugs and with said main retaining lugs forming a substantially U-shaped space into which the wheel of an automobile or the like may pass when the disc wheel is to be mounted thereon.

5. A device of the class described comprising a disc wheel, a series of main retaining lugs formed at one side thereof and arranged substantially in a semi-circle, mounting lugs formed at the same side of the disc wheel as the main retaining lugs, the mounting lugs being spaced at opposite sides of a center line and with said main retaining lugs defining a generally U-shaped space into which the wheel of an automobile or the like may pass when the disc wheel is to be mounted thereon, and auxiliary retaining lugs formed at the same side of the disc wheel as said other lugs and positioned at opposite sides of said center line on the half of the wheel opposite said main retaining lugs and within said U-shaped space, said auxiliary retaining lugs being adapted to cooperate with said main retaining lugs to retain the disc wheel on the rim of an automobile or like wheel.

6. A device of the class described as defined in claim 5 having pivoted non-return detents extending into said U-shaped space near the outer end thereof, adapted to prevent return movement of the wheel of an automobile or the like being inserted into said space.

7. A device of the class described comprising a disc wheel, a series of main retaining lugs formed at one side thereof, and arranged substantially in a semi-circle, guide lugs, mounting lugs, and auxiliary retaining lugs, the guiding lugs, the mounting lugs and the auxiliary retaining lugs being formed at the same side of the disc wheel as the main retaining lugs, the main retaining lugs, the guiding lugs, and the mounting lugs forming a generally U-shaped space into which the wheels of an automobile or the like may pass when the disc wheel is to be mounted thereon, auxiliary retaining lugs being positioned at opposite sides of a median line, at the half of the wheel opposite said main retaining lugs and within said U-shaped space, said auxiliary retaining lugs being adapted to engage behind the rim of an automobile or like wheel after it has been placed in the base of said U-shaped space and to cooperate with said main retaining lugs to retain the disc wheel on the rim of the automobile or like wheel.

8. A device of the class described as defined in claim 7 having non-return detents pivoted to said disc wheel for extending through openings in the mounting lugs to said U-shaped space, near the outer end thereof, adapted to prevent the wheel of an automobile or the like being inserted into said space.

9. A device of the class described comprising an emergency wheel, means carried thereby to secure it to the rim of an automobile or the like, and means to lock the emergency wheel to the rim of the automobile or the like after it has been secured thereto including an elongated member of substantially C-shaped in transverse cross section passing through a pair of spaced parallel slots in the disc wheel, said elongated member having one edge thereof engaged by the rim of the automobile or like wheel when the emergency wheel is being placed thereon and thereby turned to a position in which the one edge engages behind the rim of such automobile or like wheel.

10. A device of the class described as defined in claim 1 having means to lock the disc wheel to the rim of the automobile or the like after the emergency wheel has been secured thereto.

11. A device of the class described as defined in claim 1 having means to lock the disc wheel to the wheel of the automobile or the like after the emergency wheel has been secured thereto including an elongated member of substantially C-shaped in transverse section passing through a pair of spaced parallel slots in the disc wheel, said elongated member having one edge thereof engaged by the rim of the automobile or like wheel when the emergency wheel is being placed thereon and thereby turned to a position in which the one edge engages behind the rim of such automobile or like wheel.

12. A device of the class described as defined in claim 5 having means to lock the disc wheel to the wheel of an automobile or the like after it has been secured thereto.

13. A device of the class described as defined in claim 5 having means to lock the disc wheel to the wheel of the automobile or the like after it has been secured thereto, said locking means including an elongated member of substantial C-shape in transverse section, passing through a pair of spaced parallel slots in the disc wheel, said elongated member having one edge thereof engaged by the rim of the automobile wheel or the like when the emergency wheel is being placed on the automobile wheel or the like and thereby turned to a position in which the other edge engages behind the rim of such automobile wheel or the like.

14. A device of the class described as defined in claim 5 and means to lock the disc wheel to the wheel of the automobile or the like after it has been secured thereto, said locking means, in moving to locking position, springing the part of the disc wheel carrying the auxiliary retaining lugs away from the automobile or like wheel sufficient to permit the automobile or like wheel to move past said retaining lugs.

15. A device of the class described as defined in claim 5 having means to lock the disc wheel to the wheel of the automobile or the like after it has been secured thereto, said locking means including an elongated member of substantial C-shape in transverse section, passing through a pair of spaced parallel slots in the disc wheel, said elongated member having one edge thereof engaged by the rim of the automobile wheel or the like when the emergency wheel is being placed on the automobile wheel or the like and thereby turned to a position in which the outer edge engages behind the rim of said automobile wheel or the like, said C-shaped member having limited rotative movement in said slots and the turning of said member in said slots during the insertion of the automobile or like wheel into said U-shaped space springing the part of the disc wheel carrying the auxiliary retaining lugs away from the automobile or like wheel sufficient to permit the automobile or like wheel to move past said retaining lugs.

16. A device of the class described comprising an emergency disc wheel having a series of spaced lugs formed on one side thereof, said lugs being of generally hook-shape so as to pass over and around the edge of the wheel rim and being arranged substantially in a semi-circle, so as, collectively, to extend around one-half the periphery of the wheel rim, in combination with means for preventing disengagement of said lugs from the wheel rim, whereby said disc wheel may be securely locked to a wheel rim.

17. A device of the class described comprising an emergency disc wheel having a series of lugs formed on one side thereof, said lugs being of generally hook-shape and adapted to pass over and around the edge of the wheel rim, and means carried by the disc wheel operable by engagement with a wheel rim, upon the placing of the emergency wheel on the wheel rim, to lock said disc wheel to the wheel rim, and thereby prevent disengagement of said lugs therefrom.

18. A device of the class described comprising an emergency disc wheel, means carried by the disc wheel and for detachably securing said disc wheel to a wheel rim, and separate means for locking the disc wheel to the wheel rim, said separate locking means comprising a member carried by the disc wheel and having a part adapted to engage over and behind an edge of the wheel, said member being rotatable to a position to cause said part to engage over and behind an edge of the wheel.

ALLEYNE C. HOWELL Jr.

REFERENCES CITED

The following references are of record in the file of this patent:

UNITED STATES PATENTS

| Number | Name | Date |
|---|---|---|
| 1,526,060 | Geisendorfer | Feb. 10, 1925 |
| 2,179,170 | Bahensky | Nov. 7, 1939 |